United States Patent
Krouse et al.

[19]

[11] Patent Number: 6,097,834
[45] Date of Patent: Aug. 1, 2000

[54] FINANCIAL TRANSACTION PROCESSING SYSTEMS AND METHODS

[75] Inventors: Louis J. Krouse, Rancho Palos Verdes, Calif.; Eric F. Strovink, Nashua, N.H.

[73] Assignee: PayStation America Inc., Los Angeles, Calif.

[21] Appl. No.: 08/874,312

[22] Filed: Jun. 13, 1997

[51] Int. Cl.[7] .................................................. G06K 9/00
[52] U.S. Cl. .......................................... 382/137; 382/139
[58] Field of Search .................................... 382/137, 176, 382/306, 135, 139, 138; 705/44, 45; 707/522, 52, 6

[56] References Cited

U.S. PATENT DOCUMENTS

| | | | |
|---|---|---|---|
| 4,166,945 | 9/1979 | Inoyama et al. | 235/379 |
| 4,254,474 | 3/1981 | Cooper et al. | 364/900 |
| 4,264,808 | 4/1981 | Owens et al. | 235/379 |
| 4,310,885 | 1/1982 | Azcua et al. | 364/405 |
| 4,326,259 | 4/1982 | Cooper et al. | 364/715 |
| 4,385,285 | 5/1983 | Horst et al. | 382/3 |
| 4,760,604 | 7/1988 | Cooper et al. | 382/15 |
| 4,948,174 | 8/1990 | Thomson et al. | 283/58 |
| 4,958,375 | 9/1990 | Reilly et al. | 382/14 |
| 5,053,607 | 10/1991 | Carlson et al. | 235/379 |
| 5,054,093 | 10/1991 | Cooper et al. | 382/14 |
| 5,111,395 | 5/1992 | Smith et al. | 705/45 |
| 5,121,945 | 6/1992 | Thomson et al. | 283/58 |
| 5,122,950 | 6/1992 | Benton et al. | 705/45 |
| 5,193,055 | 3/1993 | Brown et al. | 364/406 |
| 5,206,803 | 4/1993 | Vitagliano et al. | 364/408 |
| 5,237,159 | 8/1993 | Stephens et al. | 235/379 |
| 5,265,008 | 11/1993 | Benton et al. | 364/408 |
| 5,283,829 | 2/1994 | Anderson | 380/24 |
| 5,297,026 | 3/1994 | Hoffman | 364/408 |
| 5,369,709 | 11/1994 | Foreman et al. | 380/51 |
| 5,383,113 | 1/1995 | Kight et al. | 364/401 |
| 5,394,469 | 2/1995 | Nagel et al. | 380/4 |
| 5,412,190 | 5/1995 | Josephson et al. | 235/379 |
| 5,465,206 | 11/1995 | Hilt et al. | 364/406 |
| 5,483,445 | 1/1996 | Pickering | 364/406 |
| 5,532,464 | 7/1996 | Josephson et al. | 235/379 |
| 5,590,196 | 12/1996 | Moreau | 380/18 |

*Primary Examiner*—Matthew Bella
*Attorney, Agent, or Firm*—Hayes, Soloway, Hennessey, Grossman & Hage, PC

[57] ABSTRACT

In accordance with the present invention, financial transaction processing systems and methods are provided. One preferred embodiment of a method according to one aspect of the present invention includes generating an optically scanned image of at least a portion of document containing visual data, in a particular format, representing information related to the financial transaction. Recognition characteristics are generated from the scanned image and are compared to respective sets of reference recognition characteristics generated from respective other transaction documents having different respective formats to determine therefrom whether the particular format of the visual data matches one of the respective formats of the other documents. When such a match is found to exist, location is determined of a field in the scanned image to which optical character recognition may be applied to generate therefrom the information, based upon the respective format found to match the particular format of the visual data. Optical character recognition is then utilized to generate said visual data from said location.

14 Claims, 12 Drawing Sheets

FINANCIAL TRANSACTION PROCESSING SYSTEMS AND METHODS

BACKGROUND OF THE INVENTION

1. Field of the Invention

The present invention relates generally to financial transaction processing systems and methods, and more specifically, to such systems and methods wherein at least one document containing financial transaction-related information is optically scanned to generate at least one computer-readable image from which the information may be extracted for use in processing the transaction. Particular utility for the present invention is found in the area of processing electronic financial transactions (e.g., electronic funds transfer (EFT) and Automatic Clearing House (ACH) transactions), although other utilities are also contemplated for the present invention, including other financial transaction processing and accounting applications. Additionally, although the present invention will be described in connection with processing financial transactions based at least partially upon information contained on specific types of financial documents (e.g., drafts, checks, and billing documents), it should be understood that processing of financial transactions based upon other types of documents, including other types of financial documents, may also be accomplished, without departing from the present invention.

2. Brief Description of Related Prior Art

Many systems and methods exist in the prior art for electronically processing and/or executing financial transactions. For example, debit card systems exist wherein EFT and/or ACH transactions may be authorized to pay for goods or services at the point of sale (e.g., at the merchant or retailers place of business, and/or at the location of third party transaction agent for the merchant or retailer). Such systems typically include a mechanism for reading customer bank account information encoded on a magnetic strip on the customer's debit card, which information is then utilized by the system to generate an EFT or ACH request from the customer bank account to the payee's bank account (e.g., the retailer's or merchant's bank account). Typically, prior to executing the EFT or ACH request, the system requires the customer to input a pre-selected Personal Identification Number (PIN) or other type of authorization information associated with the debit card being used in the transaction, and unless the pre-selected PIN or authorization information is input correctly, the system will not execute the request.

However, despite growing use of debit card transactions for point of sale payment of goods or services, tendering of paper negotiable instruments (e.g,. checks and drafts), remains the most widely used method of effectuating such payment. Many customers appear to favor effectuating point of sale payments using such negotiable instruments, and conversely, appear to disfavor effectuating such payments via debit cards. This is unfortunate, since processing by merchants of negotiable instruments tendered at point of sale for payment of the merchants' goods or services creates substantial problems.

For example, processing by merchants of such negotiable instruments significantly increases transaction costs associated with sale of the merchants' good and services. Typically, a merchant accepting payment in the form of a negotiable instrument must wait a "float" period of one or more days following deposit of the instrument in the merchant's bank account for the instrument to clear the bank on which it is drawn, and for the funds transferred via the instrument to be actually made available in the merchant's bank account. The loss of use of the payment funds during this float period deleteriously affects merchant cash flow.

Additionally, the merchant accepting payment via a negotiable instrument usually does not know whether the presenter of the instrument has sufficient funds or whether the presentee of the instrument intends to honor the instrument. The risks and merchant bank charges associated with potential and/or actual non-payment of the instrument drives up merchant costs associated with acceptance of the instrument as payment for the merchant's goods and/or services.

Furthermore, under present banking regulations, although there is no limit to the number of times EFT or ACH transactions refused due to insufficient funds can be resubmitted for payment, a check returned to the merchant for insufficient funds can only be once re-submitted to the banking system for payment. This means that once a check has twice been returned to a merchant for insufficient funds, the merchant must seek to obtain payment for the goods and/or services provided in exchange for the check via means outside the banking system (e.g., by contacting the customer or payor of the check, turning the check over to a collection agency, and/or turning to litigation). Each of these options involves expenditures of time, money, and other resources by the merchant.

As a solution to the aforesaid problems associated with acceptance of negotiable instruments as point of sale payment for goods and services, it has been proposed to permit merchants to "convert" such negotiable instruments into EFT or ACH transactions. That is, it has been proposed to permit merchants to accept tender of negotiable instruments at point of sale as payment for their goods and services, but to allow the merchants to submit, at the point of sale, without prior consent of the payor of the negotiable instrument, EFT or ACH requests equivalent to the transactions specified in the negotiable instruments, in place of actually submitting the negotiable instruments themselves to the banking system for collection.

Unfortunately, the United States Federal Reserve System has been unwilling to allow merchants to "convert" such negotiable instruments into EFT or ACH transactions, without prior approval or authorization of the payor of the negotiable instrument, and some payors have instituted litigation challenging the legality of such unauthorized "conversions" by merchants. To the best of the knowledge and belief of the Applicant, all such litigation has been settled in favor of the payors.

Systems and methods also exist in the prior art for effectuating payment of bills or accounts payable via EFT and/or ACH transactions. For example, various commercially available computer software programs exist for electronically paying bills based upon information (e.g., bill payee, amount due, etc.) manually input to the program by a human user, or provided to the program from a previously generated file containing such information. Disadvantageously, such programs require a significant amount of human operator interaction which can slow the process of paying bills using such programs. Further disadvantageously, such programs are subject, to a significant degree, to human operator errors (e.g., input of erroneous payment information), which can result in generation of erroneous electronic bill payments.

Other conventional bill and accounts payable payment systems and methods optically scan billing or accounts payable documents to generate computer-readable scanned images of the documents, and determine from the scanned images the amounts due and billing account information (e.g., customer billing account numbers) respectively specified on the documents being scanned. With previously granted authorization for same, EFT and/or ACH transaction requests may then be generated based upon the amounts due and billing account information, whereby to effectuate payment of the bills or accounts payable. Unfortunately, such conventional payment techniques typically are only capable of accurately recognizing and processing a single, "pre-selected" type of billing or accounts payable document format, and if billing or accounts payable documents having different formats from the "pre-selected" format are processed using these techniques, it can be expected that erroneous amounts due and billing account information may be generated, and therefore, erroneous EFT and/or ACH transaction requests may also be generated. Furthermore, since many different types of billing and accounts payable document formats exist, and in many instances the particular document format utilized is unique to the party generating the document (e.g., the vendor or service provider issuing the document), the fact that these prior art techniques are able to properly recognize and process only a single document format type means that only those documents generated by a single party (or, at most, a small number of parties) may be properly recognized and processed by these prior art techniques.

Examples of prior art financial transaction processing systems and methods are disclosed in e.g., Owens et al., U.S. Pat. No. 4,264,808; Moreau, U.S. Pat. No. 5,590,196; Josephson et al., U.S. Pat. No. 5,412,190; Stephens et al., U.S. Pat. No. 5,237,159; Josephson et al., U.S. Pat. No. 5,532,464; Foreman et al., U.S. Pat. No. 5,369,709; Inoyama et al., U.S. Pat. No. 4,166,945; Azcua et al., U.S. Pat. No. 4,310,885; Hilt et al., U.S. Pat. No. 5,465,206; Pickering, U.S. Pat. No. 5,483,445; and Carlson et al., U.S. Pat. No. 5,053,607. Unfortunately, all of the prior art disclosed in these patents suffers from the aforesaid and/or other disadvantages and drawbacks.

SUMMARY OF THE INVENTION

Accordingly, in a first aspect of the present invention, a system and method are provided for processing an electronic financial transaction based upon visual information related to the transaction contained on a document tendered by a party to the transaction. One preferred embodiment of the system of this aspect of the present invention includes an optical scanner for generating a computer-readable scanned image of the document, and an optical character recognizer for generating, from the scanned image, transaction data indicative of at least a portion of the visual information. This embodiment of the system of this aspect of the present invention also includes an authorization record generator for generating, based upon the transaction data, a record of the transaction for being assented to by the party tendering the document prior to completion of the transaction, and for generating from the record once it is assented to by the party, a computer-readable record of assent of the party to the transaction. A collection system is also included in this embodiment of the system of this aspect of the present invention for generating in response to the transaction data and the computer-readable record, an electronic financial transaction request for being used by an electronic transaction system to execute the electronic financial transaction.

One embodiment of the method of the first aspect of the present invention includes generating a computer-readable scanned image of the document, and generating, from the scanned image, transaction data indicative of at least a portion of the visual information contained on the document. A record is generated, from the transaction data, of the electronic financial transaction being processed, which record is for being assented to by the party tendering the document, prior to completion of said transaction. Once the record has been assented to by the party tendering the document, a computer-readable record of the party's assent to the transaction is generated from the assented-to record. An electronic financial transaction request is then generated in response to the transaction data and the computer-readable assented-to record, which request is for being used by an electronic financial transaction system to execute the electronic financial transaction.

Also, in a second aspect of the present invention, a system and method are provided for use in processing a financial transaction based at least in part upon visual data formed on a document. The visual data represents information related to the transaction and is in a particular format.

One preferred embodiment of the system of the second aspect of the present invention includes an optical scanner for generating a scanned image of at least a portion of the document containing the visual representation. An image characterization generator is provided for generating recognition characteristics from the scanned image, and a recognition characteristic comparitor is provided for comparing the recognition characteristics to respective sets of reference recognition characteristics generated from respective other transaction documents having different respective formats and for determining therefrom whether the particular format of the visual data on the scanned document matches one of the respective formats of the other documents. A field location generator is also provided for determining, based upon the one respective format when the particular format is determined to match the one respective format, location of a field in the scanned image to which optical character recognition (OCR) may be applied to generate therefrom the transaction-related information represented by the visual data. OCR is then applied by an image processor to this location to generate the visual data for use in processing the transaction.

One preferred embodiment of the method according to the second aspect of the present invention includes generating an optically scanned image of at least a portion of document containing visual data, in a particular format, representing information related to the financial transaction. Recognition characteristics are generated from the scanned image and are compared to respective sets of reference recognition characteristics generated from respective other transaction documents having different respective formats to determine therefrom whether the particular format of the visual data matches one of the respective formats of the other documents. When such a match is found to exist, location is determined of a field in the scanned image to which optical character recognition may be applied to generate therefrom the information, based upon the respective format found to match the particular format of the visual data. Optical character recognition is then utilized to generate said visual data from said location.

Advantageously, the system and method of the first aspect of the present invention permit negotiable instruments payments tendered at a point of sale to be "converted" into legally binding equivalent EFT and/or ACH transactions, thereby overcoming the aforesaid and other disadvantages and drawbacks associated with tender of negotiable instruments payments at point of sale and unauthorized conversion of same into equivalent EFT and/or ACH transactions.

Also advantageously, the system and method of the second aspect of the present invention require less human interaction, are less prone to human operator errors, and are faster in operation than the aforesaid conventional computer programs for electronically paying bills, and are able to properly recognize and process transaction documents having different respective format types.

These and other features and advantages of the present invention will become apparent as the following Detailed Description proceeds and upon reference to the Drawings, wherein like numerals depict like parts and in which:

Although the following Detailed Description will proceed with reference being made to specific embodiments of the present invention, it should be understood that the present invention is not intended to be limited to these embodiments. Rather, many alternatives, modifications, and variations thereof will be apparent to those skilled in the art. Accordingly, the present invention should be viewed broadly, as being limited only as set forth in the hereinafter appended Claims.

DETAILED DESCRIPTION OF PREFERRED EMBODIMENTS

Figure 1:
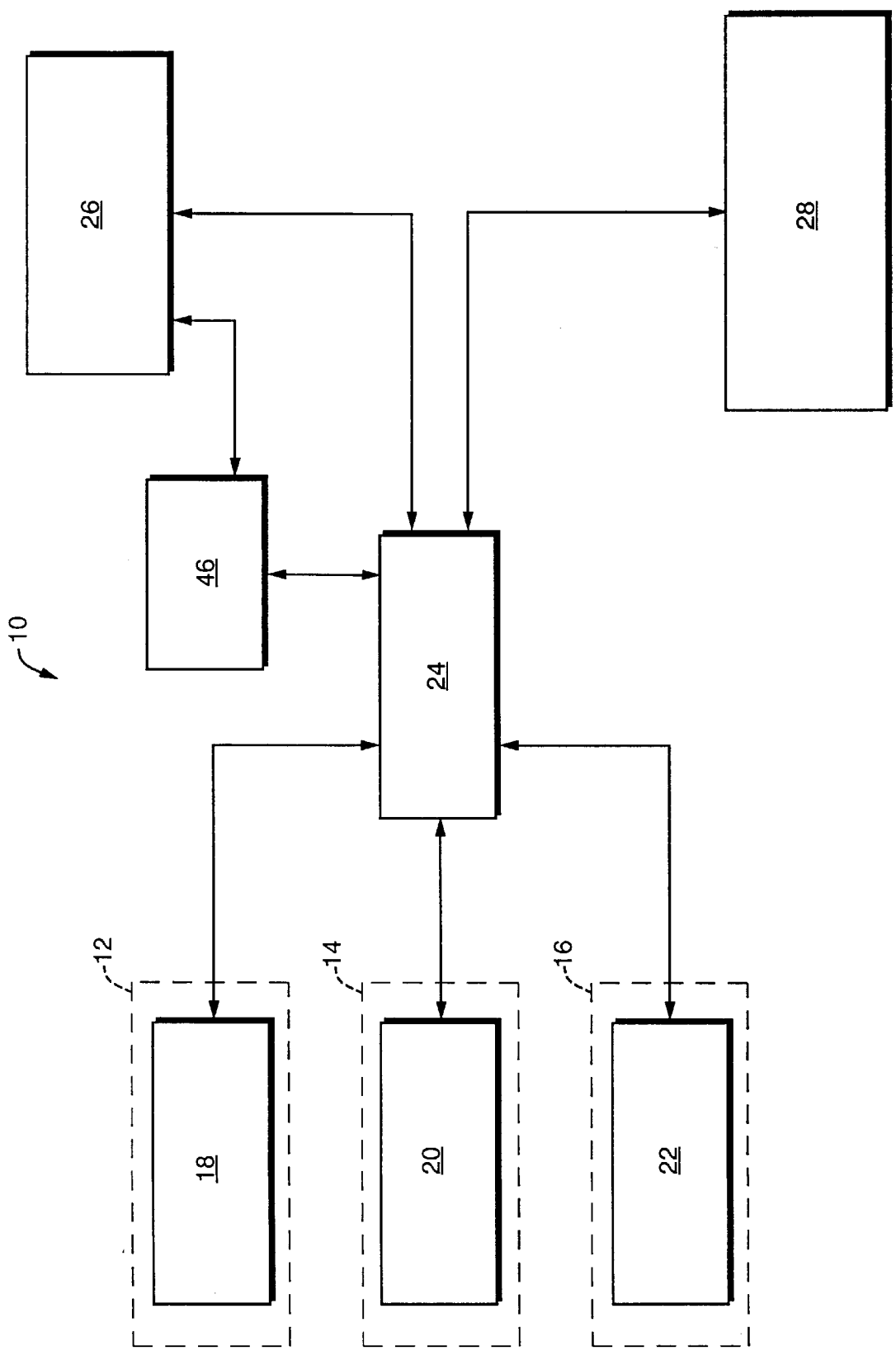
FIG. 1 is an architectural-level, block diagram of the functional components of one preferred embodiment of the system of a first aspect of the present invention.
Figure 2:
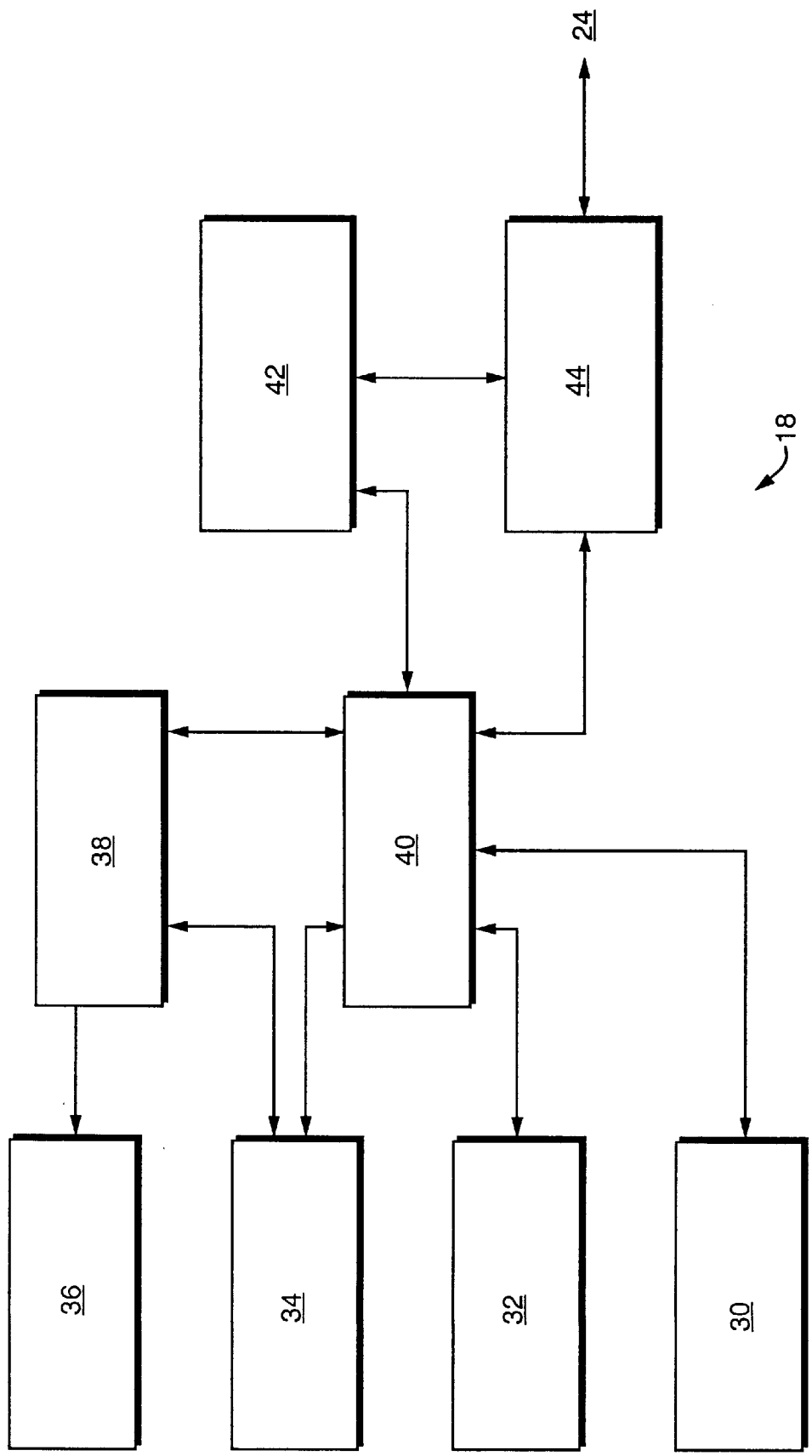
FIG. 2 is block diagram of the functional components of one preferred construction of a point of sale payment terminal of the preferred embodiment of FIG. 1, all of the point of sale payment terminals shown in FIG. 1 preferably being of identical construction to that shown in FIG. 2.
Figure 3:
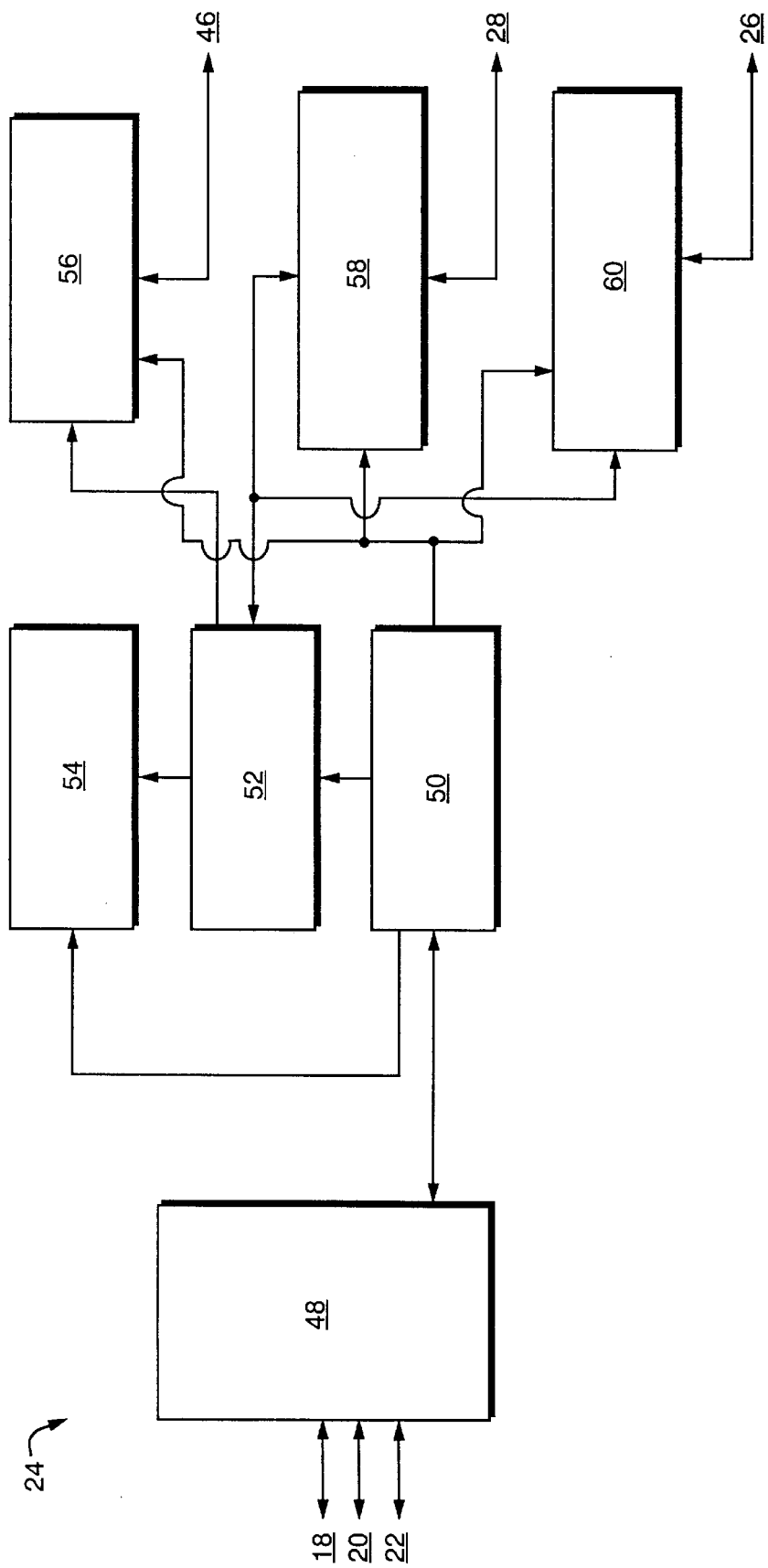
FIG. 3 is a block diagram of one preferred construction of the collection system of the preferred embodiment of FIG. 1.

Turning now to FIGS. 1–6, one preferred embodiment of the system of the first aspect of the present invention will be described. As shown in FIG. 1, system 10 comprises at least one 18, and preferably a plurality 18, 20, 22 of point of sale payment terminals. Each terminal 18, 20, 22 preferably is located in its own respective point of sale location 12, 14, 16 (e.g., at a merchant's or retailer's place of business, and/or at the location of third party transaction agent acting on behalf of the merchant or retailer). It should be understood that although three terminals 18, 20, 22 are shown as being comprised in system 10, system 10 could be modified to include any number of such terminals without departing from this aspect of the present invention.

Each of the terminals 18, 20, 22 includes an optical scanner 34 for scanning negotiable instrument documents, (exemplified by check 110 shown in FIG. 6) tendered at point of sale in payment for goods or services provided by the merchant or retailer associated with that point of sale, to generate respective computer-readable scanned images of the documents. Preferably, scanner 34 comprises a conventional monotonal image scanner having a resolution of at least 300 dots-per-inch and being adapted for being controlled by local controller/processor 40 to scan one or both sides of a document 110 placed in the scanner 34.

When it is desired to begin processing of a point of sale electronic transaction using system 10, a negotiable instrument document tendered in payment at the point of sale is placed in the scanner 34 by a human operator (not shown) of the terminal at the point of sale or by the party (also not shown) tendering the document 110 in such a way as to permit the scanner 34 to scan at least one entire side 112 of the document 110 when the scanner 34 is activated. The scanner 34 then signals to the controller 40 the presence of the document in the scanner 34, which controller 40 then causes the user input/display device 30 to indicate same to the human operator. Preferably, device 30 comprises a conventional alphanumeric keypad and/or keyboard for permitting input to the processor 40, by the human operator, of data and commands (which will be described more fully below) related to the transaction being processed, and an LCD/LED or computer monitor for displaying information transmitted thereto from the processor 40 and for echoing information data and commands input via the device 30.

Preferably, if the point of sale 12 is the premises of a third party payment agent for the merchant or retailer that is actually providing the goods or services for which payment is being effected by tender of the negotiable instrument 110, prior to placing the document 110 in the scanner 34, the human operator of the payment terminal 18 inputs (e.g., as a result of or after tallying the purchases being paid for by the check 110) to the processor 40 via the device 30 data indicative of both the amount of the payment and the payee to which the payment is being made (i.e., the payment amount indicated on the negotiable instrument being tendered in payment). Preferably, there is permitted to be only one payee per transaction. Alternatively, if the point of sale is the merchant's or retailer's premises, negotiable instruments processed via the terminal at that point of sale will presumably only be made out to a single payee (i.e., the merchant or retailer at the point of sale); in such instances, the human operator may simply input data indicative of the amount of the payment being made, and the processor 40 may be adapted to automatically associate appropriate payee identification data with the inputted payment amount data. In either case, this data is stored by the processor 40 in local storage system 42 for later processing in the manner described below. Processor 40 also includes timing means for permitting processor 40 to determine the current date and time, and when processing of the transaction is initiated by the human operator, the date of time of initiation of the transaction is also recorded in the storage system 42 in association with the aforesaid other data stored therein. Preferably, system 42 comprises a combination of conventional volatile and non-volatile electronic memory means (e.g., RAM, ROM, EEPROM, etc.) and secondary storage means (e.g., fixed disk storage, optical disk storage, etc.) to and from which data may be written and read, respectively, by the processor 40 and by the collection system/terminal interface 44 (as will be will be described more fully below). Of course, it should be appreciated that inputting of the aforesaid data could be accomplished prior to placing the negotiable instrument in the scanner 34, without departing from this embodiment of the present invention.

Once the aforesaid data (i.e., payment amount being tendered and payee) has been input via the device 30, document 110 has been placed in the scanner 34, and presence of the document 110 in the scanner 34 has been signalled to the terminal operator, the terminal operator continues processing the document 110 by commanding the processor 40 via the device 30 to initiate scanning of the document 110. In response, the processor 40 issues commands to the scanner 34 to scan the document 110 placed therein, whereupon, the scanner 34 scans at least one entire side 112 of the draft 110 so as to generate a computer-readable scanned image of at least that entire side 112 of the draft document 110 (i.e., computer-readable data from which an appropriately provisioned computer may generate a display image of the at least one scanned side 112 of the document 110). The computer-readable scanned image data is then transmitted by the scanner 34 to the processor 40; the processor 40 then transmits to the optical character recognizer 32 a copy of the scanned image data generated by the scanner 34 in order to permit the recognizer 32 to process same in the manner described below. A separate copy of the scanned image data is also transmitted to the storage system 42 where it is stored in association with the previously stored payment amount and payee data of the negotiable instrument being processed.

The American Banking Association, U.S. Federal Reserve and other government agencies have promulgated fairly extensive and detailed regulations mandating standardization in the format of checks and other draft documents drawn on U.S. financial institutions. As a result, the position, style, sizing, etc. of certain key portions or elements in such documents are substantially standardized. One such standardized portion in check 110 is Magnetic Ink Character Recognizable (MICR) line 94, which is positioned at the bottom of the check 110 and in check 110, includes three fields 114, 116, 118 of printed digits separated by special control characters. Fields 114, 116 contain the financial institution transaction routing number and account number on which the check 110 is drawn, and field 118 contains the check number of the check 110. It should be noted, however, that other than the left most nine digits (and associated separator characters) of the MICR line 94, the contents of said line may vary, depending upon the financial institution upon which the negotiable instrument is drawn. System 10 may be adapted to recognize and parse information contained in different types of negotiable instrument MICR lines (not shown).

Based upon the standardized location, size, style, etc. of the MICR line 94 in document 110 and the fields 114, 116, 118 contained therein, recognizer 32 utilizes optical character recognition and image processing techniques to extract from the scanned image data the data generated by the scanner 34 from scanning the MICR line portion 94 of the document 110, and once thus extracted, to generate numeric transaction data indicative of the visual information (i.e., the numbers printed in fields 114, 116, 118) in MICR line 94. This numeric data is then transmitted to the processor 40, which transmits a copy of the numeric data to the storage system 42 where it is stored in association with the scanned image data and the payee and payment amount data previously stored therein.

A second copy of the numeric data is also transmitted from the processor 40 to the authorization record generator 38, which also retrieves from the storage system 42 the payee and payment amount data associated with this transaction and transmits same to the generator 38. Processor 40 also supplies to the generator 38 from the storage system 42 data indicative of the initiation of the current transaction. Preferably, each of the terminals 18, 20, 22 of the system 10 is associated with a unique station/terminal identification code or number which is stored in the terminal's respective storage system 42. This terminal identification number is also supplied to the generator 38 from the system 42.

Generator 38 utilizes the numeric transaction data, payee and payment amount data, transaction date and time data, and terminal identification number to generate, for each point of sale financial transaction processed by the terminal, a unique respective record of the transaction for being assented to by the party tendering the negotiable instrument document being processed by the terminal. For each such transaction, the generator 38 causes the unique respective record generated by the generator 38 to be printed out by printer 36 (which comprises, e.g., a conventional laser printer) as a respective hard copy transaction record. An example of one such hard copy transaction record 70 is shown in FIG. 4.

Figure 4:
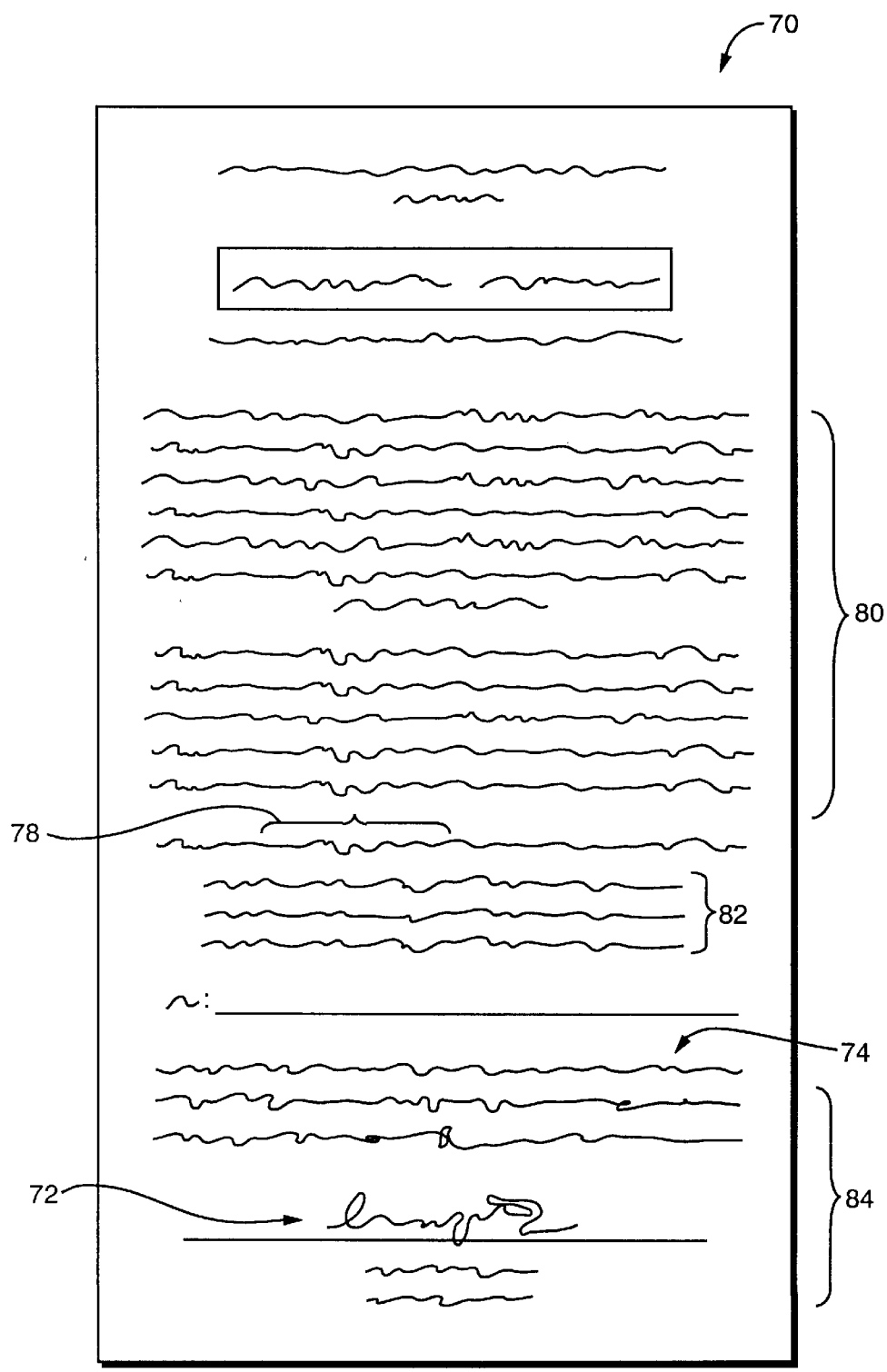
FIG. 4 is a preferred form of an authorization slip for use in the preferred embodiment of FIG. 1.
Figure 6:
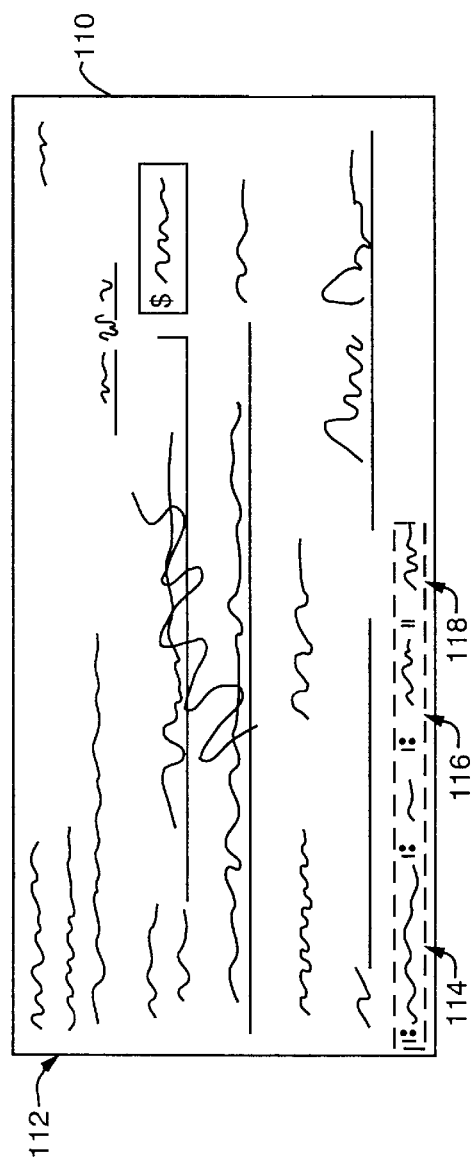
FIG. 6 is one type of negotiable instrument that can be processed by the preferred embodiment of FIG. 1.

As shown in FIG. 4, each transaction record 70 generated by the generator 38 includes an authorization contract portion 80 which contains language approved by the National Automated Clearing House Association for the party tendering the negotiable instrument being processed in the transaction to give approval to conversion of the payment being made by the negotiable instrument to an equivalent EFT transaction. The language contained in portion 80 also authorizes the party processing the transaction (e.g., the merchant, retailer, or third party transaction agent at the point of the sale) to convert the EFT transaction to an equivalent paper draft transaction in the event that the EFT transaction cannot be completed (e.g., due to insufficient funds for carrying out the EFT transaction or because the financial institution upon which the negotiable instrument 110 is drawn cannot process EFT requests), and to charge the tendering party's account in the event of such insufficient funds.

Each transaction record 70 also includes a portion 78 which specifies the date and time of processing of the transaction, a portion 76 specifying the terminal identification number of the terminal processing the transaction, and a transaction data section 82 specifying the numerical transaction data generated from the scanned image. Each transaction record 70 also contains a unique transaction identification number generated by the generator 38 by concatenating a 5-digit form of the terminal identification number to the time and date of the transaction in numerically expressed in the form YYYYMMDDHHMM (wherein YYYY represents the year, the left most MM represents the month, DD represents the day of the month, HH represents the hour in said day, and the right most MM represents the minutes in said hour of the transaction) and to a system-wide, unique 5-digit daily transaction sequence number (which is reset system-wide, periodically, e.g., once per day), and a tendering party assent portion 84 for receiving a signature 72 from the tendering party or other authorized representative thereof for signifying assent by the tendering party to the terms and conditions specified in the record 70. Optionally, the record 70 may also contain a signatory identification line 71 for permitting the operator of the terminal to write thereon identification information provided by the individual signing the record 70 to ensure that the individual signing the record 70 is in fact authorized to assent to the terms and conditions specified on the record.

Once the record is signed by the party tendering the negotiable instrument being processed, or by that party's authorized representative, the operator of the terminal places the assented-to record (preferably, side-ways) in the scanner 34 in a such a way as to permit the scanner 34 to be able to scan at least the signed side of the record. Once the presence of the record in the scanner 34 is indicated on the device 30, the operator then commands the processor 40 via the device 30 to command the scanner 34 to scan the signed record. Scanning of the signed record by the scanner 34 generates a computer-readable scan file of the signed record, which scan file is rotated appropriately (i.e., to rotate the image represented by the data in the scan file) and transmitted to the recognizer 32 via the processor 40. Recognizer 32 generates a truncated scan file from the scan file of the signed record, using optical character recognition and image processing techniques, which truncated scan file contains only the portions of the scan file of the signed record generated from the transaction identification portion 74, an indication as to which type of form language has been assented to ("Direct Express Form #ACH1.0, above" in FIG. 4), and signed authorization portion 84 of the record 70. The truncated scan file is then transmitted to the storage system 42, via the processor 40, where it is stored in association with the other data previously stored therein that is associated with the transaction. Also, the generator 38 transmits to the storage system 42 via the processor 40 the unique transaction identification number for this transaction, which number is also stored in the storage system 42 in association with the other previously stored therein that is associated with the transaction. The generator 38 then commands the printer 36 to print out a transaction receipt reciting the amount of the negotiable instrument tendered in payment in the transaction, the payee of the instrument, and the information contained in the MICR line of the negotiable instrument.

In accordance with this aspect of the present invention, no paper records of the transaction need be maintained by the merchant, retailer, or third party transaction agent at the point of sale, since all of the records necessary to reconstruct any financial transaction processed by the system 10 are stored electronically within the system 10. Advantageously, this greatly reduces the time, effort, and storage space required by merchants, retailers, and third party transaction agents to maintain records of transactions processed using system 10, and permits all of the documents processed and generated by the terminals 18, 20, 22 to be given to and retained by the customers tendering the negotiable instruments processed by the terminals 18, 20, 22, thereby permitting the merchants, retailers, or third party's processing said documents to be able to comply with U.S. Federal Reserve regulations which require that processed checks be truncated when they are not submitted in paper form to the financial institutions on which they are drawn.

Each of the terminals 18, 20, 22 includes a respective collection system/point of sale terminal interface 44; these interfaces connect the terminals 18, 20, 22 to point of sale terminals/collection system interface 48 of the collection system 24 via a conventional computer and/or telecommunications network system (e.g., a conventional wide area network, public/private telecommunications network, Transmission Control Protocol/Internet Protocol-based network, and/or ISDN-based network, not expressly referenced in the Figures). The interfaces 44 in the terminals 18, 20, 22 convert data and commands received from the collection system 24 via the not shown network system into data and command formats suitable for use by the respective processors 40 and storage systems comprised within the terminals 18, 20, 22 receiving such command and data from the collection system 24, and convert data transmitted from the respective terminals to the collection system 24 into a format suitable for transmission over the not shown network system connecting the terminals and the collection system. Similarly, interface 48 converts data received from the terminals 18, 20, 22 via the not shown network system into a format suitable for use by the controller 50 and other components of the collection system 24.

In this embodiment 10, processor 40 may be adapted to transmit to the collection system 24, once a given transaction's processing data (i.e., the processed negotiable instrument payment amount, payee, MICR line transaction data, date and time of transaction processing, processing terminal identification number, unique transaction identification number, negotiable instrument scanned image, and truncated scan file of the tendering party's signed assent record) has been acquired and stored in the processing terminal's storage system, the given transaction's processing data from the storage system 42 via the interface 44 and the not shown network system, for further processing by the collection system (as will be described in greater detail below). Alternatively, processor 40 may be adapted to store processing data of transactions until processing data from a predetermined number of such transactions have been stored, to store processing data from transactions until a predetermined time interval has elapsed, or to store processing data from transactions until a command is received from the collection system 24 to initiate transmission of stored processing data to the collection system for further processing by the collection system, whereupon the processor 40 may be programmed to transmit the stored transaction processing data to the collection system 24 for further processing thereat.

After being converted by the interface 48, transaction processing data received by the collection system 24 from the terminals 18, 20, 22 is first transmitted to the controller 50, whereupon the controller 50 immediately transmits the received transaction processing data to the storage archive system 28 via the interface 58. Archive system 28 comprises a non-volatile optical and/or magnetic media mass storage system for storing and retrieving data therein and therefrom, respectively, based upon commands and data received from the controller 50 via interface 58. Interface 58 converts commands and/or data transmitted to the archive system 28 from the controller 50, Automatic Clearing House Transaction Generator 52, and interfaces 56, 60 into formats suitable for processing by the archive system 28, and converts data transmitted from the archive system 28 into formats suitable for processing by these components.

After storing the received transaction processing data in the archive system 28, the processor 50 transmits a copy of the data to the generator 52. Generator 52 comprises an ACH EFT request generator which generates from the transaction processing data supplied thereto respective ACH EFT requests for effectuating an equivalent ACH EFT transactions for each of the respective negotiable instruments processed by the terminals to generate the transaction processing data. A copy of each of these ACH EFT requests is then transmitted to the storage archive 28 via the interface 58, and is stored in the archive 28 in association with the respective portion of transaction processing data from which it was generated by the generator 52.

In this embodiment 10, another copy of each of these ACH EFT requests is also transmitted by the generator 52 via the interface(s) 56 to the respective computer system or systems 46 of the payee or payees designed in the ACH EFT requests for submission to the ACH EFT system 26 for processing by the system 26 to effectuate the ACH EFT transactions requested by these requests. Alternatively, generator 52 may transmit one or more of the ACH EFT requests directly to the ACH system 26 via the interface 60.

The ACH system 26 and the computer system(s) 46 may be connected to the collection system 24 via wide area network means (not shown) of the type or types described previously as connecting the collection system 24 and the terminals 18, 20, 22. Interface 56 converts data and commands transmitted to the collection system 24 from the payee system(s) 46 via the not shown network means into a form processable by the various components of the collection system 24 desired to receive same, and converts data transmitted to the payee system(s) from the various components of the system 24 transmitting same into form(s) for being transmitted via such network means and so to be processable by such system(s) 46. Similarly, interface 60 converts data and commands transmitted to the ACH system 26 from the various components of the collection system 24 desired to transmit same into a form for being transmitted through such network means and processable by the ACH system 26, and converts data transmitted from the ACH system 26 to the various components of the collection system 24 desired to receive same into form for being transmitted through the network means and processable by such components.

Figure 5:
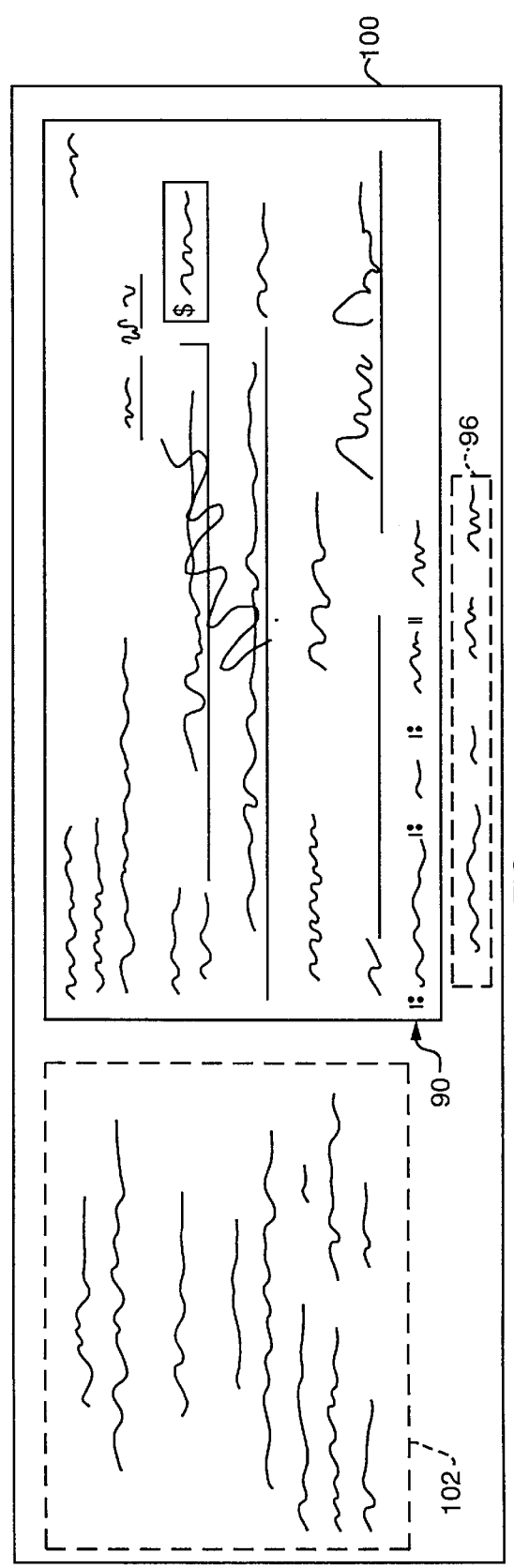
FIG. 5 is a preferred form of a reprinted negotiable instrument document generated by the preferred embodiment of FIG. 1.

In the event that any of the ACH EFT requests transmitted to the system 26 cannot be executed by the system 26 (e.g., because of insufficient funds from which to make ACH request effecuation), system 26 notifies the request transmitter (i.e., either the computer system(s) 46 or the collection system 24) of same. In response to such notification, the collection system 24 or the payee system(s) 46 receiving such notification may periodically resubmit the transaction request(s) for which execution by the ACH EFT system 26 has not been accomplished, until such execution is accomplished by the system 26. Alternatively, the payee system(s) receiving such notification may command the controller 50 of the collection system 24 to effectuate such ACH EFT request resubmission. Further alternatively, or after the system(s) 46 and/or system 24 have been notified by the system 26 a predetermined number times that ACH EFT request resubmissions made to the system 26 could not be executed by the system 26, the controller 50 may reconvert the failed EFT request(s) into negotiable instrument draft form, by retrieving from the archive 28 the transaction processing data from which the ACH EFT request(s) was generated, and commanding the document generator 54 (which e.g., comprises a conventional magnetic ink laser printer) to print out, based upon such transaction data, on appropriate negotiable instrument paper stock (e.g., check paper stock) negotiable instrument(s) equivalent to the failed ACH EFT request(s). Preferably, each of the negotiable instrument document(s) printed out by the generator 54 has the form shown in FIG. 5. As shown in FIG. 5, each such negotiable instrument document 100 printed out by the generator 54 includes one portion 104 comprising a print out of the scanned image of the original negotiable instrument 110 from which the failed ACH EFT request was generated, another portion 102 containing a print out of transaction processing data associated with negotiable instrument 110, and a third portion 96 containing a clearer print out of the MICR line 94 of the negotiable instrument 110 compliant with the American Banking Association and U.S. Federal Reserve standards regarding same. The positioning and dimensions of the three portions 104, 102, 96 are chosen so as to permit the document 100 to constitute a valid negotiable instrument processable by U.S. financial institutions to result in an equivalent financial transaction to that requested by the failed ACH EFT request associated with the document 100. In particular, it should be noted that the size of portion 104 is reduced (i.e., smaller) compared to the size of document 110.

It should also be noted that generator 54 also may be used to print out documents other than reprinted negotiable instruments of the type shown in FIG. 5. For example, based upon commands received from a user input device (not shown) in the system 24, controller 50 may be caused to retrieve from the storage system 28 and print out via generator 54 any other portion of the transaction processing data stored in the archive 28, and/or may be adapted to periodically generate via generator 54 paper records of the transaction processing data contained in system 28.

Figure 7:
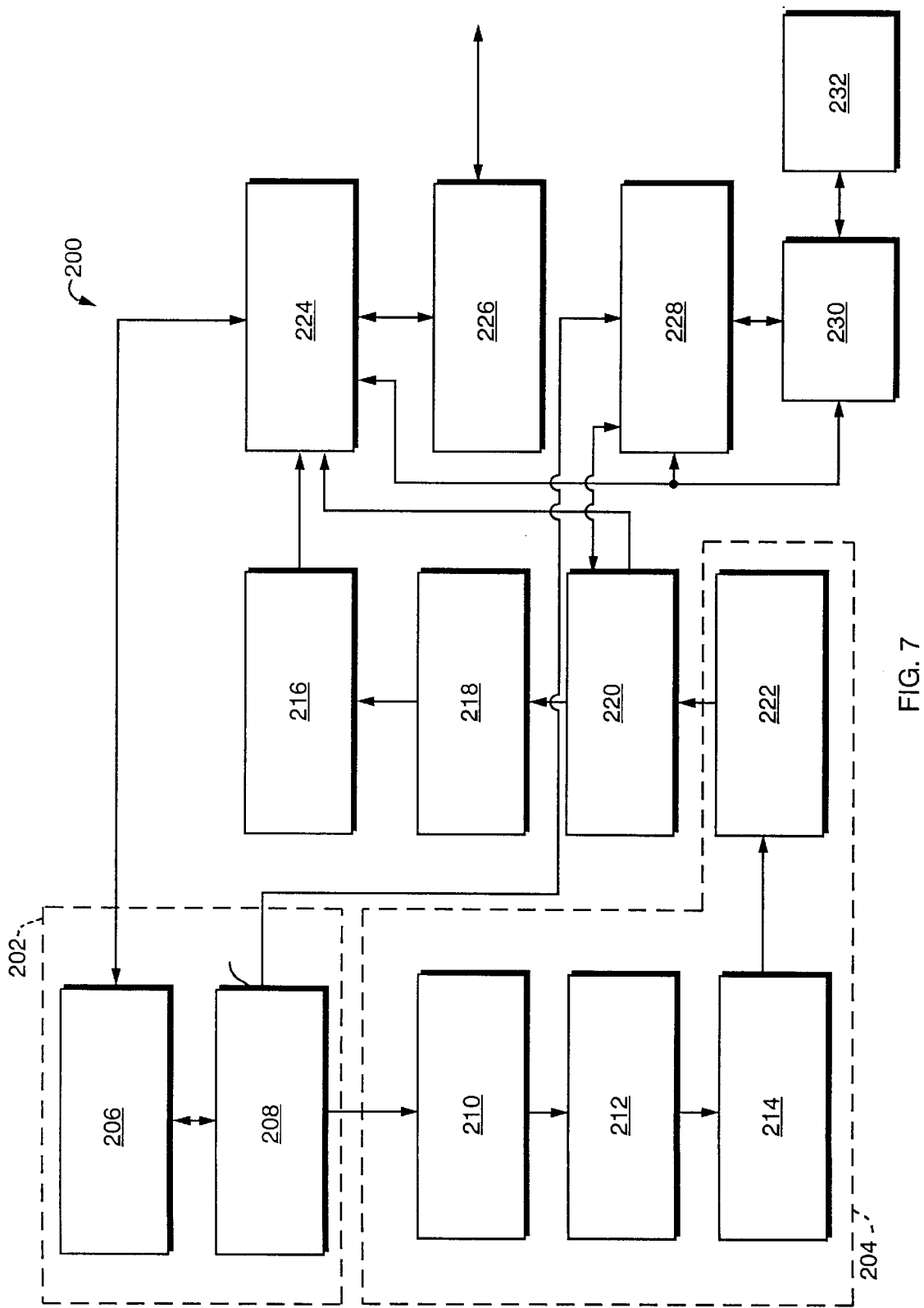
FIG. 7 is an architectural-level, block diagram of the functional components of one preferred embodiment of the system of the second aspect of the present invention.

Turning now to FIG. 7, a preferred embodiment 200 of a system according to the second aspect of the present invention will be described. System 200 comprises at least one bill payment terminal 202. It should be understood that although only one such bill payment terminal 202 is shown in FIG. 7, system 200 may comprise a plurality of such terminals without departing from this aspect of the present invention. Terminal 202 comprises a user interface/display device 206 and an optical scanner 208. Device 206 preferably comprises a conventional graphical user interface and system control means or other type of human input/output, control and display means for permitting a human operator (not shown) to monitor and control operation of various of the functional components of the system 200 in the manner described more fully below. Scanner 208 preferably comprises a conventional scanner device that is substantially identical to scanner 34 of system 10.

Figure 8A:
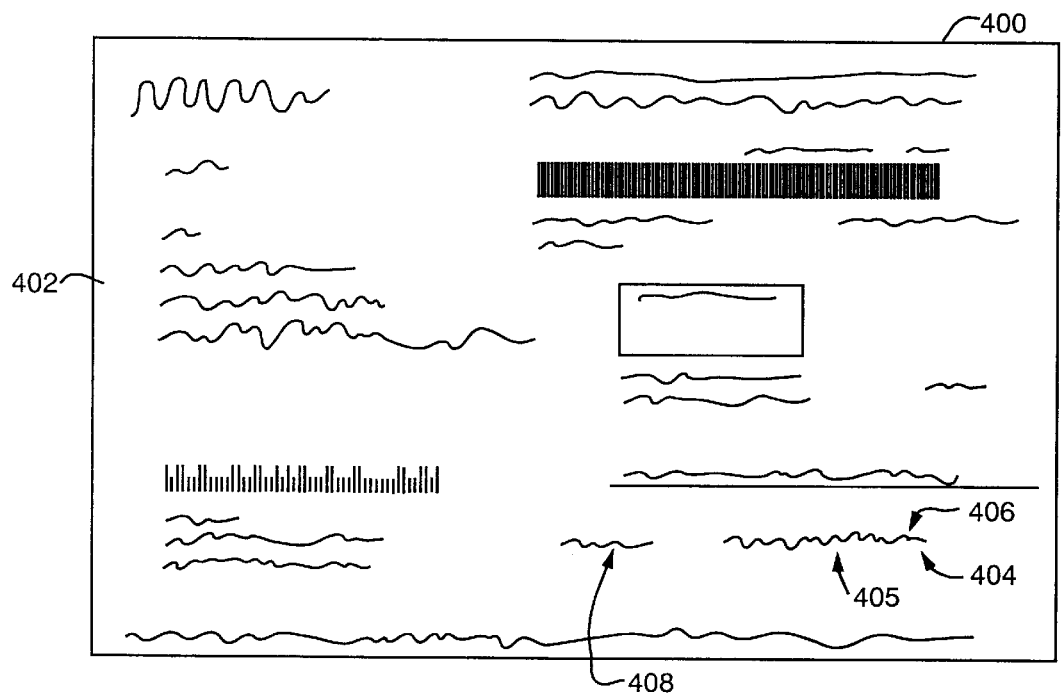
FIGS. 8A–8F are billing documents that can be processed by the preferred embodiments of FIGS. 7.
Figure 8B:
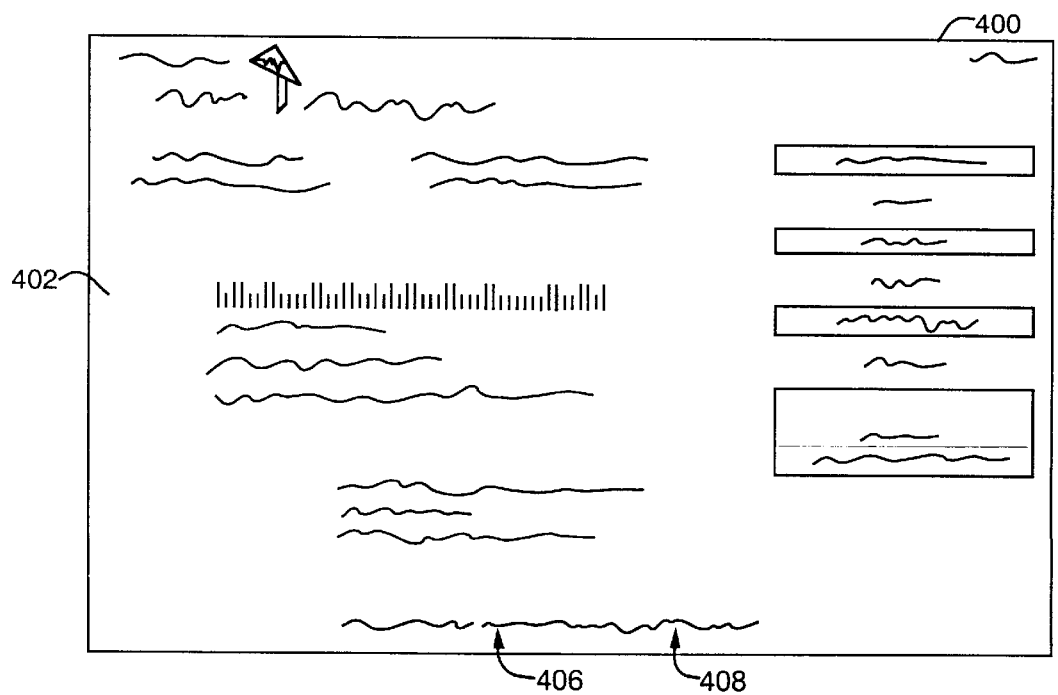
Figure 8C:
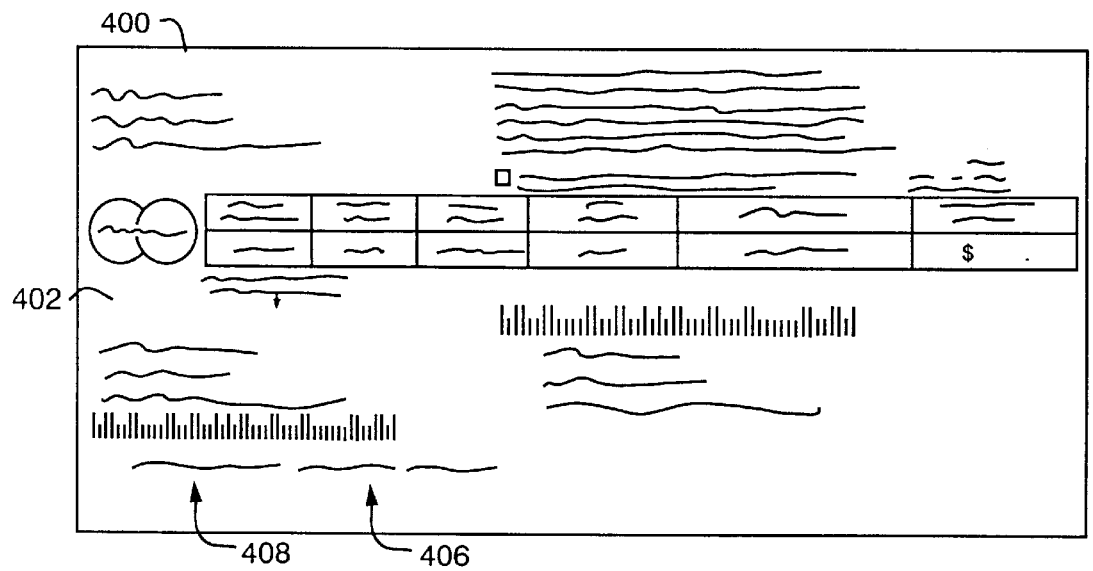
Figure 8D:
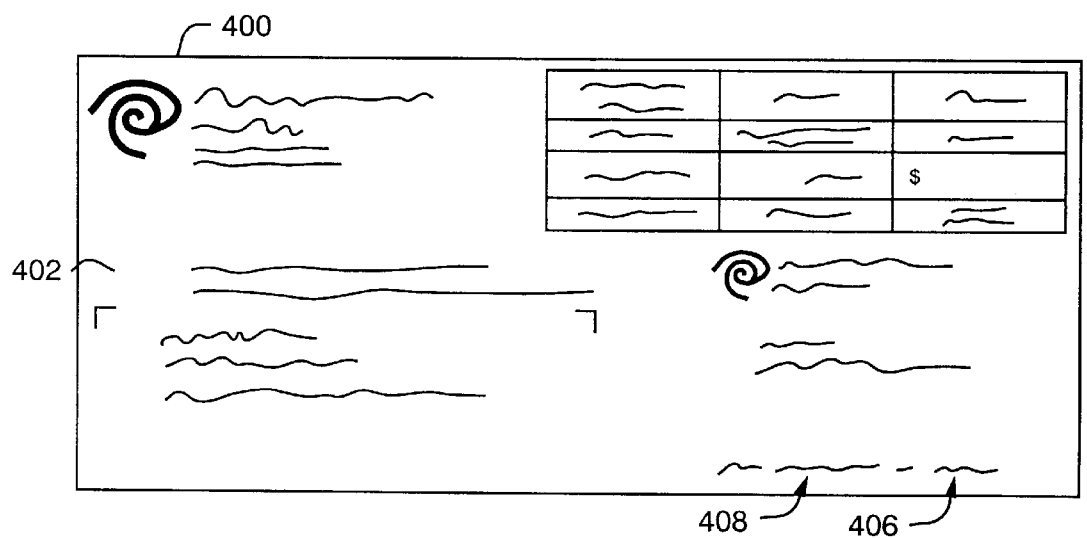
Figure 8E:
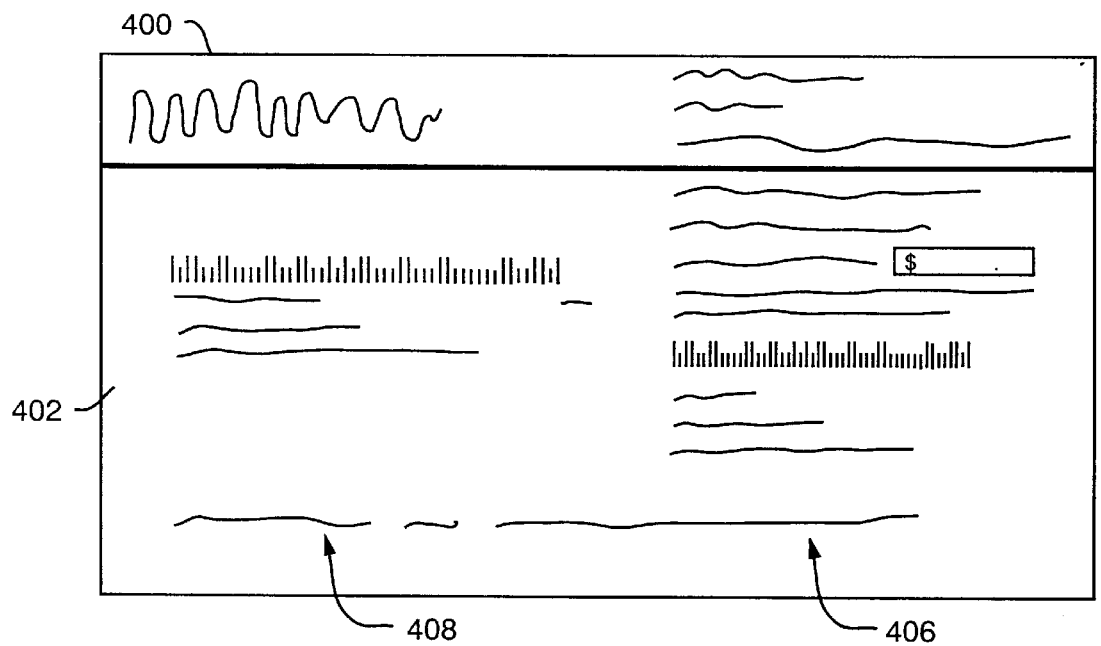
Figure 8F:
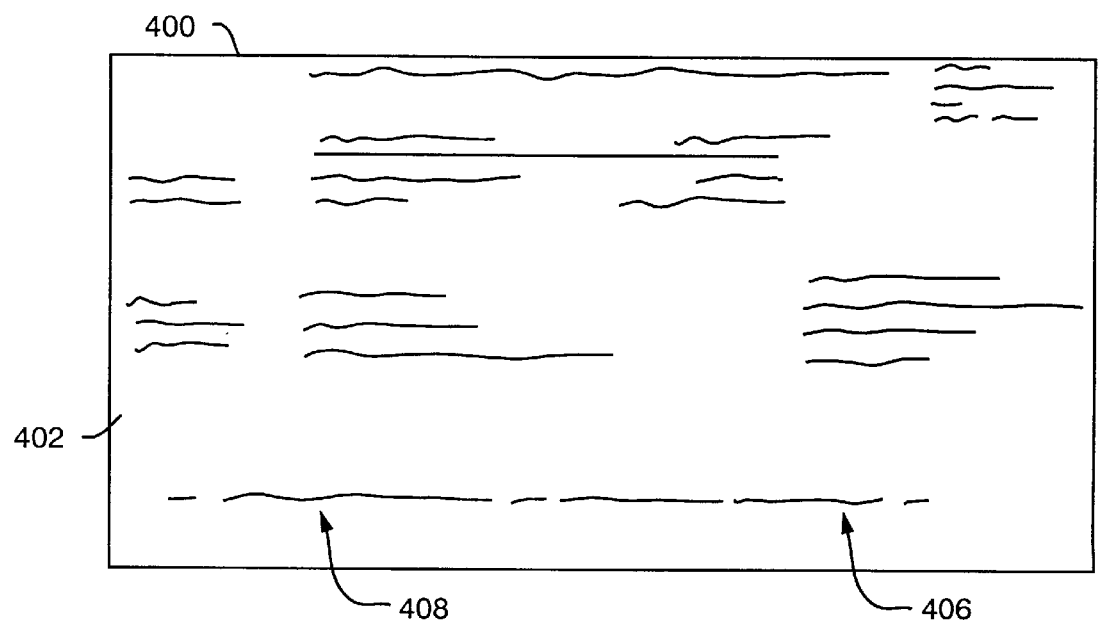

Processing of a financial transaction using system 200 begins by placing a bill document (such as bill document 400 shown in FIG. 8A) to be processed into scanner 208 so as to permit at least one side 402 of the document 400 containing an optical character recognition line (OCR) 404 which contains numerical data 405 visually displaying information related to the transaction to be processed (e.g., amount due 406 and customer account number 408). It should be understood that although the functional components and operation of system 200 will be described in connection with processing of document 400, advantageously, system 200 can be used to scan other types of billing documents (e.g., those illustrated in FIGS. 8B–8F), in accordance with this aspect of the present invention.

For reasons that will become apparent below, in order for a billing document to be processable using system 200, the document must contain an OCR line containing the aforesaid types of visual numeric data found in exemplary document 400. Preferably, this OCR line in the billing documents processable in system 200 is printed in a standard OCR-A font, however, other print fonts may be used to form the OCR line in billing documents processable by system 200 without departing from this aspect of the present invention.

When the document 400 is placed into the scanner 208, the scanner 208 indicates same to the display 206, whereupon the human operator (not shown) of the terminal 202 commands the scanner 208 to scan the entire side 402 of the document 400 containing the visual data 405 to generate a computer-readable scanned image of side 402 of the document 400 (i.e., computer-readable data from which an appropriately provisioned computer may generate a display image of the at least one scanned side 402 of the document 400). This scanned image of side 402 is then transmitted to the image characterization generator 204 in order to generate therefrom recognition characteristics for permitting the system 200 to determine whether document 400 has a format that matches that of another billing transaction document and to execute further processing based upon this determination, as will be described in greater detail below.

When the scanned image is first received by the generator 204, it is processed by an image de-skewing processor 210, such as Scanfix Image Processor available from TMS Sequoia, of Burlingame, Calif., which adjusts the scanned image data by rotating and/or translating the scanned image so as to cause two adjacent edges (e.g., the top and left side edges) of the scanned image (i.e., the edges of the scanned image generated from the top and left side edges of the document 400) to be aligned with the ordinate and abscissa of an orthogonal coordinate system whose center is chosen so as to coincide with the dark pixel of the scanned image closest to those two adjacent edges. Once the processor 210 has accomplished this processing of the scanned image data, the scanned image data is next processed by the noise eliminator 212, which processes the image data to remove dark pixels (i.e., non-whitespace pixels) therefrom that were erroneously generated as a result of noise. The noise eliminator 212 accomplishes this by locating isolated groups of contiguous dark pixels in the scanned image data having respective sizes (i.e., respective numbers of pixels) smaller than three dark pixels; these isolated groups of contiguous dark pixels are then removed from the scanned image data and replaced with whitespace by the processor 212.

After being processed by the noise eliminator 212, the scanned image data is processed by the image enhancer processor 214, which processor 214 enhances the dark pixels remaining in the scanned image after processing of the scanned image data by the noise eliminator processor 212. Processor 214 accomplishes this by locating the dark pixels remaining in the scanned image after processing of the scanned image by the processor 212, and by extending by predetermined numbers of pixels (e.g., 5 pixels in each of the positive and negative ordinate directions, and 25 pixels in each of the positive and negative abscissa directions) each of these remaining dark pixels in both of the two mutually orthogonal directions of the coordinate system to which the scanned image was aligned by the de-skewing processor 210. That is, predetermined numbers of whitespace pixels surrounding and extending from the remaining dark pixels in the two mutually orthogonal directions of the coordinate system are replaced with dark pixels. Any resulting extension of the dark pixels that would extend beyond the edge of the scanned image is prevented from doing so by truncating the extension by a predetermined number of pixels sufficient to prevent the dark pixel extensions from coming within 5 pixels of the edges of the scanned image.

After being processed by the image enhancer 214, the result, enhanced scanned image is processed by dark pixel group locator processor 222. Locator processor 222 then generates respective imaginary rectangles around the respective groups of contiguous dark pixels such that the respective rectangles each include two sides are parallel to the ordinate and two sides are parallel to the abscissa of the coordinate system to which the scanned image was aligned by the processor 210, and such that the respective rectangles include all of the respective dark pixels of each of the respective groups of contiguous dark pixels. The locator processor 222 then selects those imaginary rectangles, closest to the origin of the coordinate system, whose respective longitudinal dimensions exceed a predetermined threshold (e.g., 1 inch), and determines the respective coordinates of at least one predetermined vertex (e.g., the respective vertex having the minimal abscissal coordinate value and the maximal ordinate coordinate value for the respective rectangle) and dimensions of a predetermined number (e.g., no more than 25) of these selected imaginary rectangles. The respective vertex coordinates and dimensions of these imaginary rectangles are output by the locator processor 222 as recognition characteristics for the scanned document 400, which recognition characteristics are transmitted from the generator 204 to the recognition characteristic comparison processor 220.

In accordance with system 200 of this aspect of the present invention, archive system 228 (e.g., which comprises an optical andlor magnetic mass storage system in which data may be stored and from which such data may be retrieved) has stored within it respective sets of reference recognition characterizations, of the type generated by locator processor 222 from the scanned image of the document 400, obtained from respective scanned images of respective reference billing documents having their own respective formats. Preferably, the respective formats of these respective reference billing documents are characteristic of billing documents that are expected to be submitted by customers for processing via terminal(s) 202. Preferably, the reference recognition characterizations are generated by a reference characterization generator station (not shown) which comprises elements 208 and 204 and a graphical user interface input/output device (not shown) for permitting a user to process reference billing documents to generate respective sets of reference recognition characteristics therefrom, and to command these sets of reference recognition characteristics to be stored in the archive 228. The graphical user interface device of the reference characterization station also permits the user to input the respective coordinate positions of the respective OCR lines of the respective reference billing documents by blocking off respective rectangle surrounding the respective scanned images of the respective reference billing documents, using a graphical input device (e.g., a mouse-based input system). The user also determines empirically and inputs (or receives from the party generating the billing documents) the name, EFT payment account, and bank routing number of payee associated with each of the reference billing documents, and the length and parsing form (e.g., OCR font, customer billing account number and payment amount field information (i.e., position, length, and field offset information), etc.) of the respective OCR lines of each of the reference billing documents, which data is also stored in the archive 228 in association of the reference recognition characteristics of the respective reference billing documents. If the OCR line of a particular type of reference billing document may change from one such billing document to another, this is also input by the user interface and stored in the archive 228 in association with the respective reference characterization for the respective billing document. Optionally, check digit information may also be stored in the archive 228 in association with the reference characterizations in order to permit analysis of same to be accomplished.

Processor 220 compares the recognition characteristics of the particular document 400 being processed with the sets of reference recognition characteristics stored in the archive 228. More specifically, the vertex coordinates and dimensions of the imaginary rectangles generated by the generator 204 from the scanned image of the document 400 are compared with respective reference recognition characteristics (i.e., vertex coordinates and dimensions of imaginary rectangles) generated by the process used to generate the recognition characteristics from the scanned image of document 400, to determine whether a match exists between the recognition characteristics from the scanned image of document 400 and any one of the sets of reference recognition characteristics stored in the database archive system 228. Preferably, this is accomplished by first comparing the recognition characteristics from the scanned image of document 400 to the sets of reference characteristics, and unless the respective dimensions of at least three of the imaginary rectangles from the scanned image of document 400 match to within a predetermined error tolerance (e.g., 2 percent) of corresponding respective vertices and dimensions in a respective set of reference recognition characteristics stored in the system 228, processor 220 signals that the format of the scanned document 400 does not match any of the formats of the reference documents from which the reference recognition characteristics stored in the database archive 228 were generated. If such a "no match" condition is determined by the processor 220 to exist, the bill document 400 may be sent to the reference characterization generator station to permit the human operator to determine whether to input the reference characteristics and other bill document identification information (i.e., the other types of information stored in association with each set of reference recognition characteristics previously stored in the database archive 228) manually for storage in the archive system 228 as a new set of reference recognition characteristics to permit other bills having the same format as document 400 to be processable by terminal 202 in the future, or to process the bill payment transaction as a "one-of-a-kind" transaction (i.e., without storing such recognition characteristics and information in the database archive 228 for future use by the processor 220). Otherwise, if the predetermined match error tolerance conditions are found to exist, processor 220 selects those sets of reference recognition characteristics that are found to satisfy such conditions, and calculates the displacement differences that exist between each of the imaginary rectangles of the scanned image of the document 400 and those described in these selected sets of reference recognition characteristics (i.e., the displacements that must be applied to the imaginary rectangles of the scanned image of document 400 to accomplish a "best fit" match of same with the corresponding imaginary rectangles described in these selected sets of reference recognition characteristics). Such "best fit" match conditions are determined to exist for given corresponding rectangles of the recognition characteristics of the scanned image of the document 400 and a given respective set of reference recognition characteristics, when the absolute pixel displacement differences between the respective abscissa and ordinate coordinates of the vertices of the rectangles are within 40 pixels and 60 pixels of each other, respectively, and the respective lengths and widths of the rectangles are within 20 pixels and 2 pixels of each other, respectively. Once these absolute displacement differences have been calculated by the processor 220, processor 220 "scores" the degree of best fit match condition that exists between the imaginary rectangles of the scanned image of the document 400 and those described in the aforesaid selected sets of reference recognition characteristics, whereby to determine which one of the aforesaid selected sets of reference recognition characteristics best matches the recognition characteristics of the scanned document 400.

Preferably, this scoring is made according to the scheme described in the following Table.

TABLE

| | Score |
|---|---|
| Abscissa and Ordinate Displacements (in pixels) | |
| 0–2 | 25 |
| 3 | 23 |
| 4 | 21 |
| 5 | 18 |
| 6 | 15 |
| 7 | 13 |
| 8 | 11 |
| 9 | 10 |
| 10 | 1 |
| >10 | 0 |
| Length Difference (in pixels) | |
| 0–1 | 25 |
| 2 | 21 |
| 3 | 18 |
| 4 | 15 |
| 5 | 5 |
| 6 | 1 |
| >6 | 0 |
| Width Difference (in pixels) | |
| 0 | 25 |
| 1 | 23 |
| 2 | 10 |
| >2 | 0 |

The scores in each of the above categories is summed for each of the selected sets of reference recognition characteristics, and the respective score sum for each selected set of reference recognition characteristics is then averaged by dividing the respective score sum by the number of imaginary rectangles described by that respective selected set of reference recognition characteristics. The resultant averaged scores are then rounded to the nearest integer, and the selected set of reference recognition characteristics having the highest averaged score is determined to be the best match to the recognition characteristics generated from the scanned image of document 400.

The bill document format information (e.g., the length and parsing form of the OCR line) associated with the reference billing document from which the reference recognition characteristics were generated which were determined to constitute the best match to the recognition characteristics generated from the document 400, is then retrieved from the system 228 and forwarded to the field location generator 218. Generator 218 then uses this information to determine the location and parsing of the fields in the OCR line of the scanned image of the document 400. This OCR field location and parsing information is then transmitted from the generator 218 to the image processor 216, together with the original scanned image of the document 400, which processor 216 uses this information to apply to the particular OCR field location of the scanned image, optical character recognition to extract therefrom the numerical data 405 of the OCR line of the document 400.

This numerical data 405 is then transmitted to the ACH/ EFT request generator 224. Generator 220 also causes the archive 228 to transmit to the generator 224 the name, EFT payment account, and bank routing number of payee associated with the reference billing document whose reference recognition characteristics were determined to most closely match those of document 400. The generator 224 then causes display 206 to display this information and to prompt via the display 206 for the user/customer at the display 206 to indicate via the user interface 206 whether the displayed information is correct. If the user/customer indicates that the displayed information is correct, the generator 224 then causes the display 206 to prompt the user/customer to provide means to pay the bill whose billing information is displayed on the display 206, otherwise the user/customer is prompted to input to the generator 224 the corrected billing information, which corrected information, once input, is displayed on the display with a request that the user verify correctness of same. Once the user/customer indicates that the billing information displayed on the display 206 is correct, the generator 224 causes the display 206 to request that the user/customer indicate to the system 200 via the user interface 206 how the user/customer wishes to make payment based upon the displayed billing information. Interface 206 may comprise a conventional point of sale debit card reading/transaction mechanism (not shown) to permit the user/customer to accomplish this. The information obtained from reading the customer's debit card and provision of the customer's PIN via the interface 206 may then be utilized by the generator 224, together with the aforesaid billing information, to generate an ACH EFT request to transfer funds from the customer's bank account (indicated via the debit card information) to the bill payee's bank account, to pay the customer's bill as indicated on the billing document 400. This request is transmitted from the generator 224 to the ACH/EFT system via the interface 226, and a copy of said request is stored in the archive 228 in association with the other billing information and scanned image obtained from the document 400 by the system 200. Once the ACH system notifies the generator 224 that the request has been executed, the generator 224 provides to the payee system 232 via the interface 230 a copy of the notice, the submitted ACH/EFT request, and a statement of the customer's billing account number in order to permit the payee 232 to update its records to reflect the customer's payment to reduce the outstanding balance of the customer's billing account. Alternatively, the ACHIEFT request may be forwarded by the generator 224 to the payee 232 via the interface 230 for submission by the payee 232 directly to the ACH/EFT system. The archive 228 may also be adapted to permit the payee 232 to access the other information associated with the payee (e.g., the particular EFT requests generated for effectuating payment of bills generated by that payee and scanned images of such bills) stored in the archive 228.

Also alternatively, system 200 may be adapted to store ACH/EFT requests from a plurality of transactions and to submit the stored requests as a batch to the ACH/EFT system and/or payee(s).

System 200 may also be modified such that interface 206 comprises conventional means (not shown) for permitting the user/customer to make payment via check (or other negotiable instrument), credit card, and/or cash tendered to the operator of the interface 206.

Further alternatively, if systems 10, 200 are appropriately modified, they may be utilized in conjunction with each other such that a customer's or user's bill may be processed by system 200 to generate the aforesaid type of billing information therefrom, and system 10 may then be used to process a check or other negotiable instrument tendered by the customer or user to effectuate payment of said bill.

Figure 9:
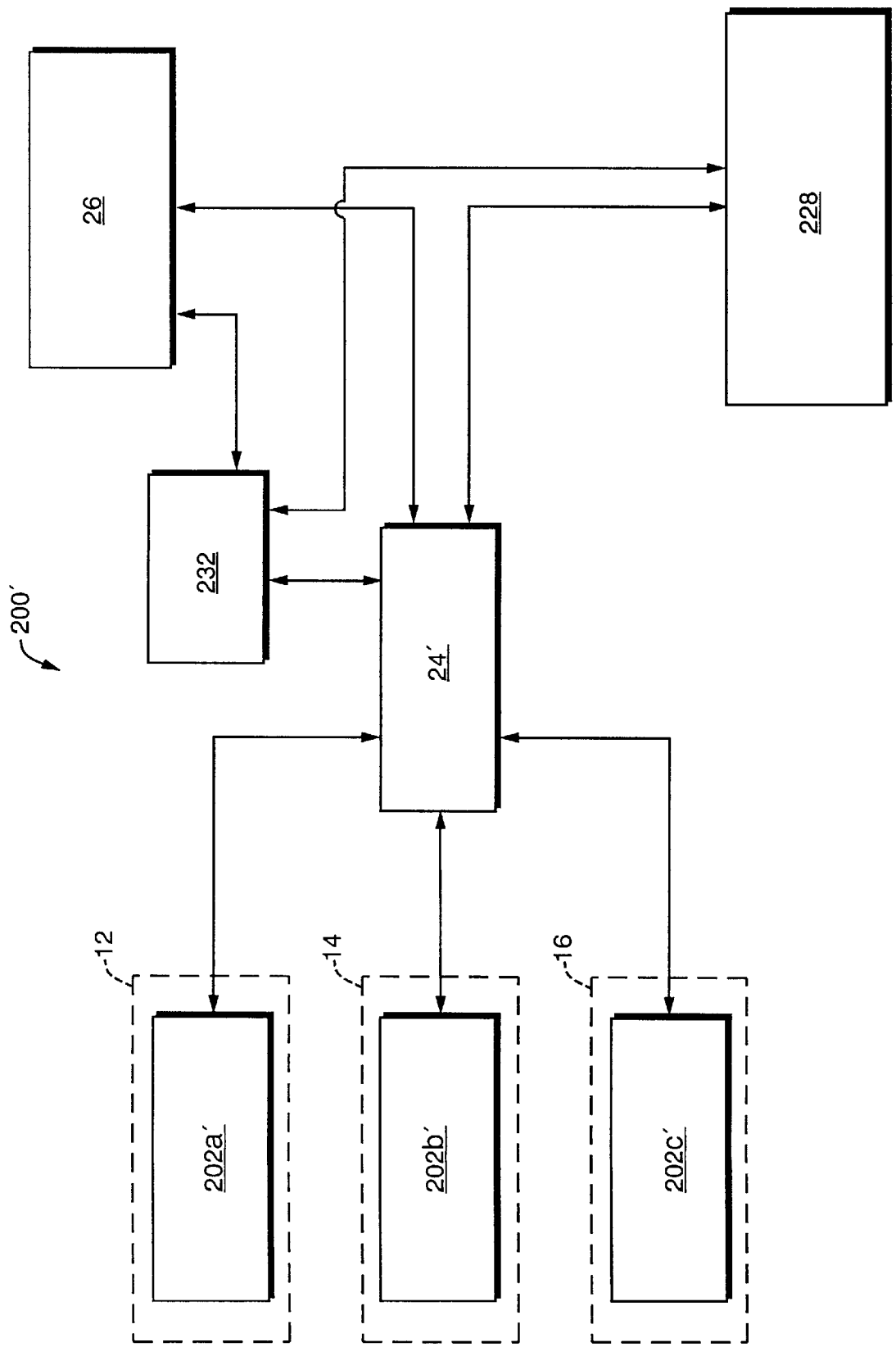
FIG. 9 is an architectural-level, block diagram of the functional components of a modification of the system of FIG. 7.
Figure 10:
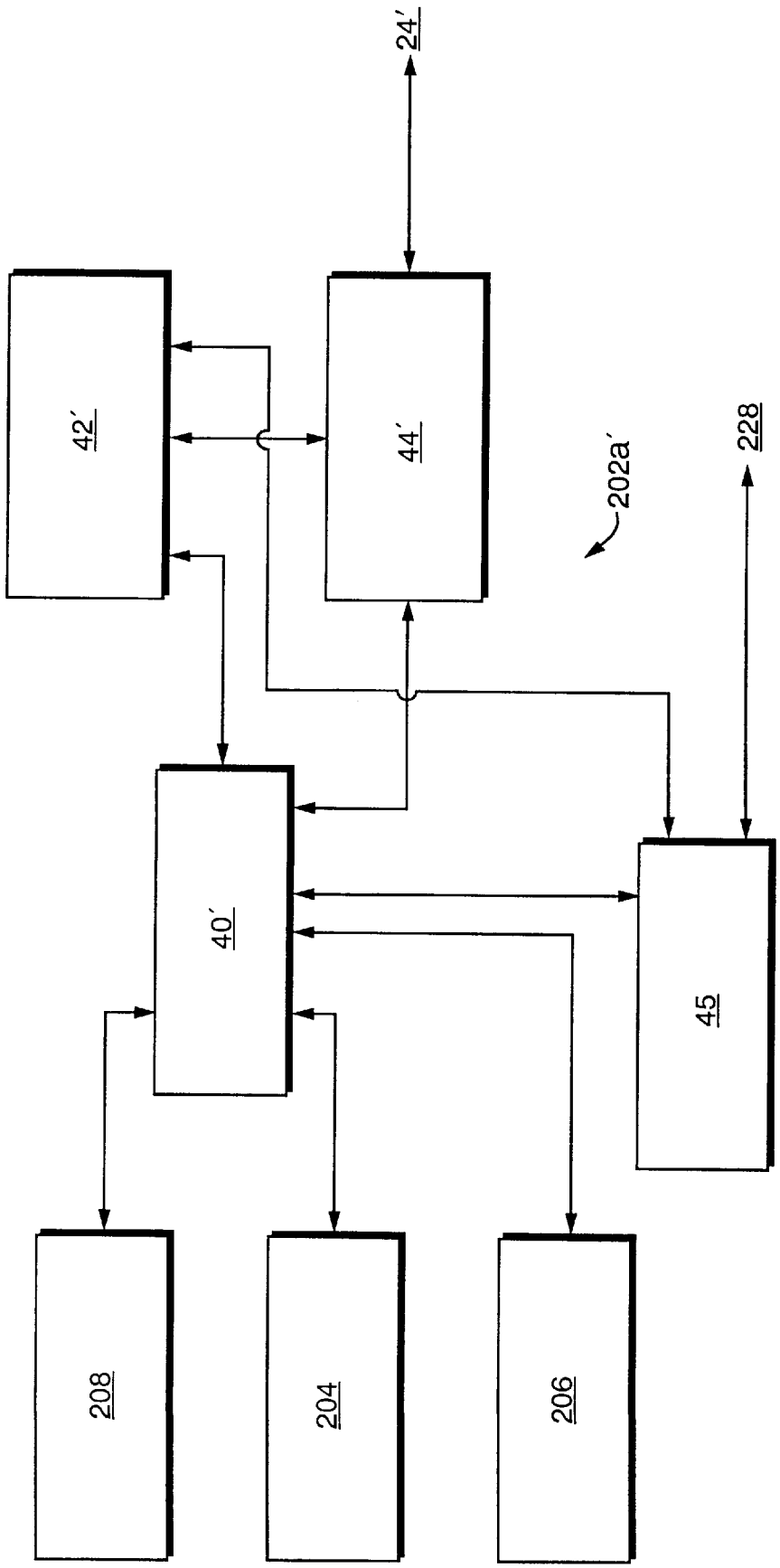
FIG. 10 is a functional block diagram of one preferred construction of a payment terminal of the system of FIG. 9.
Figure 11:
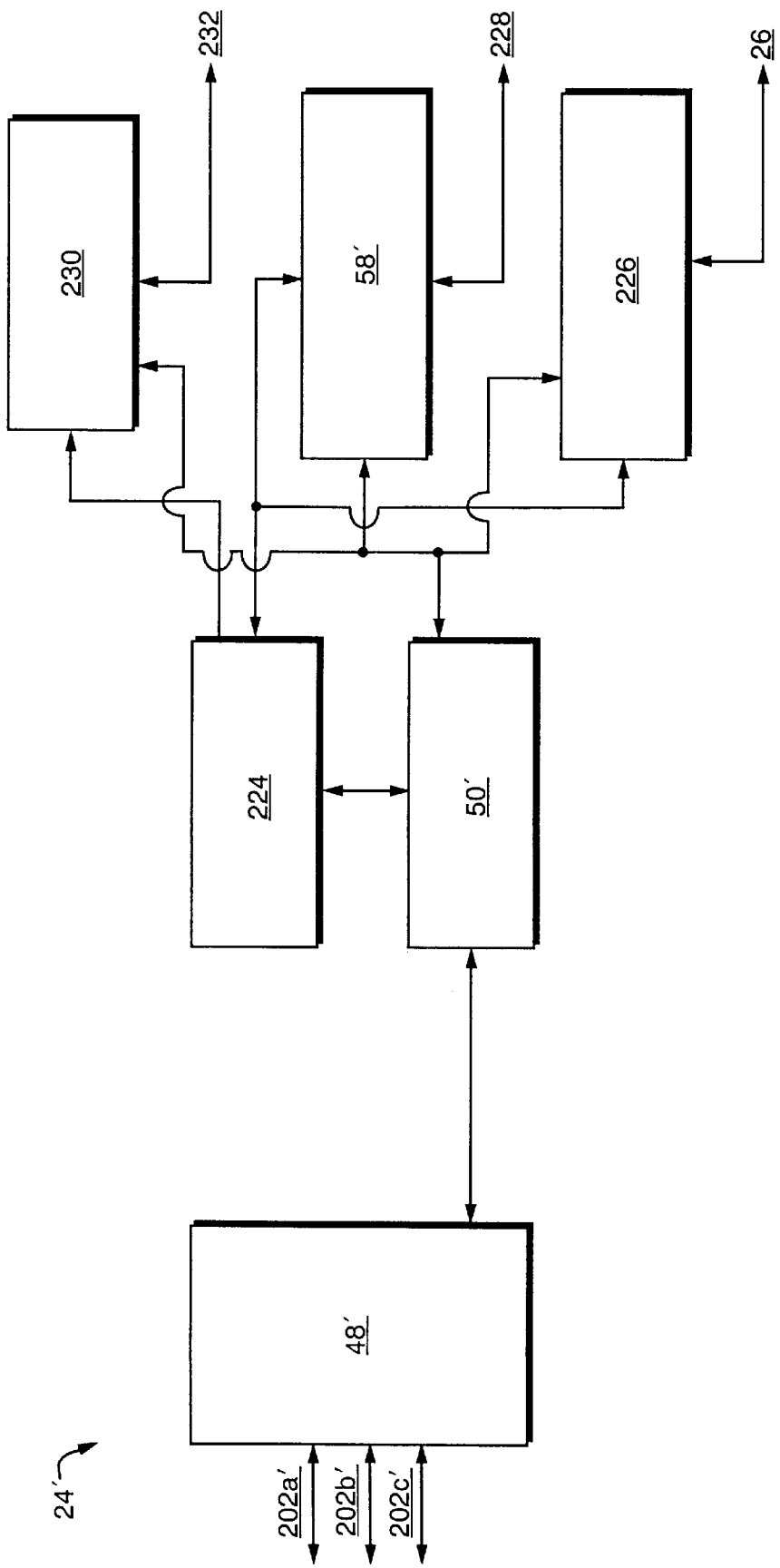
FIG. 11 is a functional block diagram of one preferred construction of the collection system of the system of FIG. 9.

Also, as shown in FIGS. 9–11, a modification 200' of the system 200 has similar architecture to that of system 10. As shown in FIGS. 9–11, system 200' may include a plurality of payment terminals 202A', 202B', 202C', each having substantially identical construction and operation and each of which is connected via a suitable wide area network to a collection system 24'. Each of the terminals 202A', 202B', 202C' comprises a local controller/processor 40' which controls operation of optical scanner 208, image characterization generator 204, input/output device 206, local storage system 42' and interfaces 44', 45 so as to process a document 400 to generate a scanned image thereof and to generate recognition characteristics from the scanned image in the manner described previously in connection with system 200, and also to transmit to the local controller 50' the recognition characteristics generated from document 400, via the interfaces 44', 48'. In this system 200', the processor 50' is adapted to carry out the functions of the recognition characteristic comparator 220, field location generator 218, and image processor 216. In embodiment 200', billing information and customer/user responses from the user interface 206 and transmitted from and to, respectively, the generator 224 via the controller 50', interfaces 48', 44', and local processor 40'. Data is exchanged between the various components of the collection system 24' and the storage archive 228 via interface 58'.

Of course, it should be appreciated that payment terminal 202 could comprise elements 206, 208, 204, 216, 218, 220, 224, and 226 without departing from the second aspect of the present invention. In such an alternate construction of system 200, the processor 220 may download reference recognition characteristics from the archive 228, as needed to accomplish the processing described above, which archive 228 may be located remotely from the terminal 202 and be connected to the terminal 202 a conventional wide area network connection system (not shown).

FIGS. 8A–8F illustrate various types of bill document formats that can be recognized by system 200 in accordance with the present invention. Of course, FIGS. 8A–8F are merely illustrative and are not intended to be limiting.

Thus, it is evident that there has been provided, in accordance with the present invention, financial transaction processing systems and methods which fully achieve the advantages, and satisfy the aims and objectives, hereinbefore set forth. Although the present invention has been described in connection with preferred embodiments and methods of use, it will be apparent to those skilled in the art that many variations, modifications, and alternatives thereof are possible without departing from the present invention. For example, while imaginary rectangles are described for accomplishing a "best fit" match, any polygon or geometric shape may be employed in the practice of the invention. Also, although various of the functional components of the systems of the first and second aspects of the present invention (e.g., recognizer 32, processor 40, record generator 38, interfaces 44, 48, 56, 58, 60, transaction generator 52, and controller 50 of system 10; image characterization generator 204, comparator 220, location generator 218, image processor 216, request generator 224, and interfaces 226, 230) preferably are embodied in whole or in part as one or more distributed computer program processes running on one or more conventional general purpose computers (e.g., IBM-compatible 80X86 based, Apple MacIntosh, and/or RISC microprocessor based computers), conventional telecommunications devices (e.g., modem, TCP/IP, and/or ISDN means) networked together by conventional hardware and software, other types of computers, telecommunications, and network devices may be used without departing from the present invention. Furthermore, it should be understood that one or more of these functional components may alternatively be constructed in whole or in part out of custom, dedicated electronic hardware and/or software, without departing from the present invention.

Further alternatively, each of the terminals 18, 20, 22, 202 of the systems 10,200 may be adapted to include its own respective ACH/EFT request generator and to directly contact the EFT/ACH system whereby to permit the respective operator of the terminal to be able to submit such EFT/ACH requests directly to the EFT/ACH system and to determine immediately whether submitted requests will clear the EFT/ACH system.

Accordingly, the present invention is intended to embrace all such variations, modifications, and alternatives as may be included within the spirit and scope of the hereinafter appended claims.

What is claimed is:

1. A system for use in processing a financial transaction based at least in part upon visual data representing information related to said transaction and formed on a document having a particular format, said system comprising:
    a. an optical scanner for generating a scanned image of at least a portion of said document containing said visual representation;
    b. an image characterization generator for generating recognition characteristics from said scanned image;
    c. a recognition characteristic comparator for comparing said recognition characteristics to respective sets of reference recognition characteristics generated from respective other transaction documents having different respective formats and for determining therefrom whether said particular format matches one of the respective formats of said other documents;
    d. a field location generator for determining, based upon the one respective format when the particular format is determined to match said one respective format, location of a field in said scanned image to which optical character recognition is applied to generate therefrom said information; and
    e. an image processor for utilizing optical character recognition to generate said visual data from said location.

2. A system according to claim 1, wherein said characterization generator includes an image de-skewer for registering the scanned image with respect to a coordinate system.

3. A system according to claim 2, wherein said image de-skewer registers said scanned image by registering dark pixels closest to respective adjacent edges of said scanned image with respect to said coordinate system.

4. A system according to claim 1, wherein said characterization generator comprises a noise eliminator for eliminating noise in said scanned image by replacing dark portions of fewer than 3 pixels in said scanned image with whitespace.

5. A system according to claim 4, wherein said characterization generator also comprises an image enhancer for enhancing said scanned image by replacing whitespace, extending in two mutually orthogonal directions around each dark pixel remaining after elimination of said noise, with respective predetermined numbers of dark pixels in each of said directions.

6. A system according to claim 1, wherein said characterization generator comprises a dark pixel group locator for locating groups of dark pixels whose sizes exceeds a predetermined threshold.

7. A system according to claim 6, wherein said recognition characteristics comprise locations of said groups of dark pixels located by said dark pixel group locator, and said respective sets of reference recognition characteristics comprise respective sets of locations of groups of dark pixels from respective scanned images of said respective other transaction documents.

8. A system according to claim 1, wherein said information comprises an amount payable from a customer, and said visual representation comprises an amount due represented numerically and an account number of said customer.

9. A method for use in processing a financial transaction based at least in part upon visual data representing information related to said transaction and formed on a document having a particular format, said method comprising:
    a. generating an optically scanned image of at least a portion of said document containing said visual representation;
    b. generating recognition characteristics from said scanned image;
    c. comparing said recognition characteristics to respective sets of reference recognition characteristics generated from respective other transaction documents having different respective formats and determining therefrom whether said particular format matches one of the respective formats of said other documents;
    d. determining, based upon the one respective format when the particular format is determined to match said one respective format, location of a field in said scanned image to which optical character recognition is applied to generate therefrom said information; and
    e. utilizing optical character recognition to generate said visual data from said location.

10. A method according to claim 9, further comprising eliminating noise in said scanned image, prior to comparison step (c), by replacing dark portions of fewer than 3 pixels in said scanned image with whitespace.

11. A method according to claim 10, further comprising enhancing said scanned image by replacing whitespace, extending in two mutually orthogonal directions around each dark pixel remaining after elimination of said noise, with respective predetermined numbers of dark pixels in each of said directions.

12. A method according to claim 9, further comprising locating groups of dark pixels whose sizes exceed a predetermined threshold.

13. A system according to claim 9, wherein said recognition characteristics comprise locations of groups of dark pixels whose sizes exceed a predetermined threshold, and said respective sets of reference recognition characteristics comprise respective sets of locations of groups of dark pixels from respective scanned images of said respective other transaction documents.

14. A system according to claim 9, wherein said information comprises an amount payable from a customer, and said visual representation comprises an amount due represented numerically and an account number of said customer.

* * * * *